UNITED STATES PATENT OFFICE.

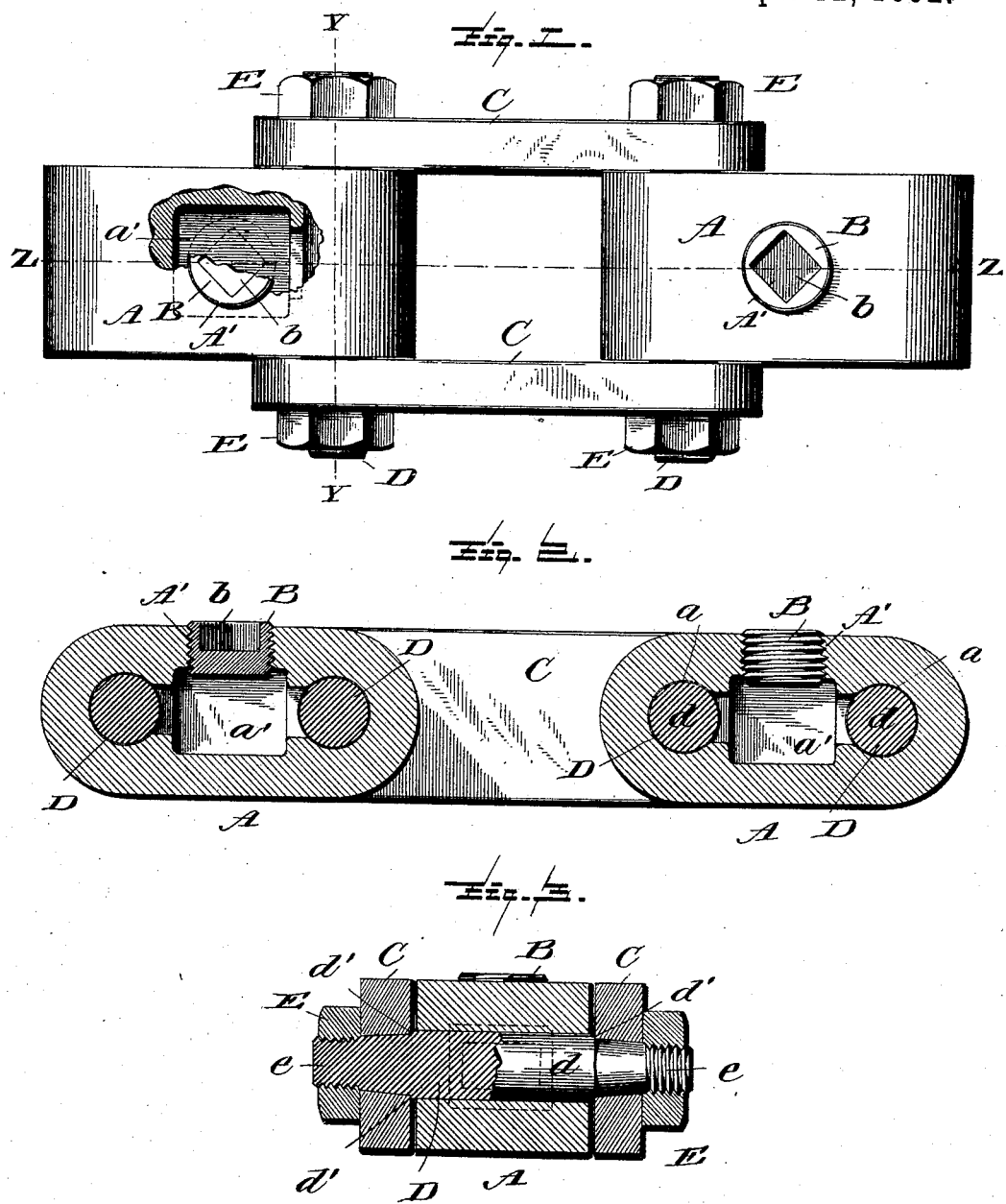

WILLIAM L. SYKES, OF BENZINGER, PENNSYLVANIA.

DRIVE-CHAIN.

SPECIFICATION forming part of Letters Patent No. 472,563, dated April 12, 1892.

Application filed January 28, 1892. Serial No. 419,541. (No model.)

*To all whom it may concern:*

Be it known that I, WILLIAM L. SYKES, a citizen of the United States, residing at Benzinger, in the county of Elk and State of Pennsylvania, have invented certain new and useful Improvements in Drive-Chains; and I do hereby declare that the following is a full, clear, and exact description of the same, reference being had to the annexed drawings, making a part of this specification, and to the letters of reference marked thereon.

This invention relates to certain new and useful improvements in drive-chains of that class in which provision is made for lubrication of the parts subject to the most wear; and it has for its objects, among others, to provide an improved chain having detachable links with lubricant-chamber communicating at each end with the pins or bolts which are passed through holes in the links.

It has for a further object to provide an improved means of fastening the pins or bolts in place. Heretofore it has been the practice to employ a straight piece of metal and simply rivet or upset the ends. Some employ a key to prevent the friction from turning the bolt or pin in the side bars; but these are objectionable, especially for heavy driving purposes, for after they are a little used they become loose and wear the holes in the side bars into an oval shape, thus rendering the side bars practically useless. I form my pin or bolt with slight shoulder and slight taper, with either nut or riveted end, preferably with nut, as it thus makes a detachable chain. My chain can be readily connected without turning the links over each other when it is necessary to put the chain together on any machine where the sprocket-wheels are fixed and cannot be moved to put the chain on. The ends of the chain can be brought to place and the side bar containing two pins can be slipped on sidewise, thus allowing the minimum amount of slack after connecting the ends of the chain. It will be noticed that when the nut on the bolt is screwed tight and the side bar is forced to the small shoulder on the bolt it is not likely that the nut or side bar will ever get loose, for it is solid metal to metal, and the great friction on the face of the nut as well as in the thread and tapering hole in side bar causes them to stick, no matter what the velocity of the chain or the jar on the sprocket-wheel. The shoulders on the pins or bolts should be sufficiently far apart— say about one thirty-second of an inch more than the width of the link or block—to allow perfect freedom when the side bars are forced tight against the shoulders.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a top plan of a portion of my chain with a portion broken away. Fig. 2 is a longitudinal section through the same on the line $z\ z$ of Fig. 1. Fig. 3 is a cross-section on the line $y\ y$ of Fig. 1 with the bolt partly in section and partly in elevation.

Like letters of reference indicate like parts throughout the several views.

Referring now to the details of the drawings by letter, A designates one of the blocks or links of the chain. It is of one piece of metal, preferably with rounded ends, as seen in Fig. 2, and having near each end a transverse substantially circular passage or hole $a$ for the passage and reception of the bolts or pins. This block is chambered, as seen at $a'$, for the reception of a lubricant, and upon the upper side is provided with an opening $A'$ into the said chamber, through which the lubricant may be placed. This opening is preferably screw-threaded, as shown in Fig. 2, and a suitable plug B is provided for closing the same. This plug may be of any well-known form of construction, preferably, however, of that form shown at the left of Fig. 2, having a depression $b$ for the reception of a suitable tool for turning it. The chamber of the block is contracted at each end, as shown in Fig. 2, so as to provide stronger bearing for the bolts and yet allow the lubricant in the chamber to at all times lie in direct contact with the said bolt, as will be understood from Fig. 2.

C are the side bars. They are of a length best suited to the character of the chain desired.

D are the bolts or pins. Each is formed with a cylindrical central portion or body $d$ of a length slightly greater than that of the thickness or width of the block, as seen in Fig. 3, and at each end of the cylindrical portion there is formed a shoulder $d'$, from which the bolt tapers outward the distance equal to the thickness of the side bar, as seen in Fig. 3, and then is screw-threaded, as seen at $e$.

E are nuts engaging the screw-threaded ends of the bolts outside of the side bars.

The advantages of the above features of construction will be readily appreciated by those accustomed to use drive-chains, and from Fig. 3 it will be seen that no matter how tight the side bars may be forced against the shoulders of the bolt the links or blocks will not be bound, but will be at liberty to move with perfect freedom.

What I claim as new is—

In a drive-chain, the combination, with the link having chamber $a'$ and transverse passages, openings from the chamber to said passages, and a plug closing the opening into the said chamber, of a bolt in each transverse passage and having a body portion conforming to said passages, with shoulders outside the block and at a slight distance therefrom, with tapered portion and screw-threads at each end beyond the shoulders, the side bars on the tapered portions and bearing against the shoulders, and the nuts on the threaded portions bearing on the side bars, substantially as specified.

In testimony that I claim the above I have hereunto subscribed my name in the presence of two witnesses.

WILLIAM L. SYKES.

Witnesses:
S. A. ROTE,
W. W. BARBOUR.